Figure 1:
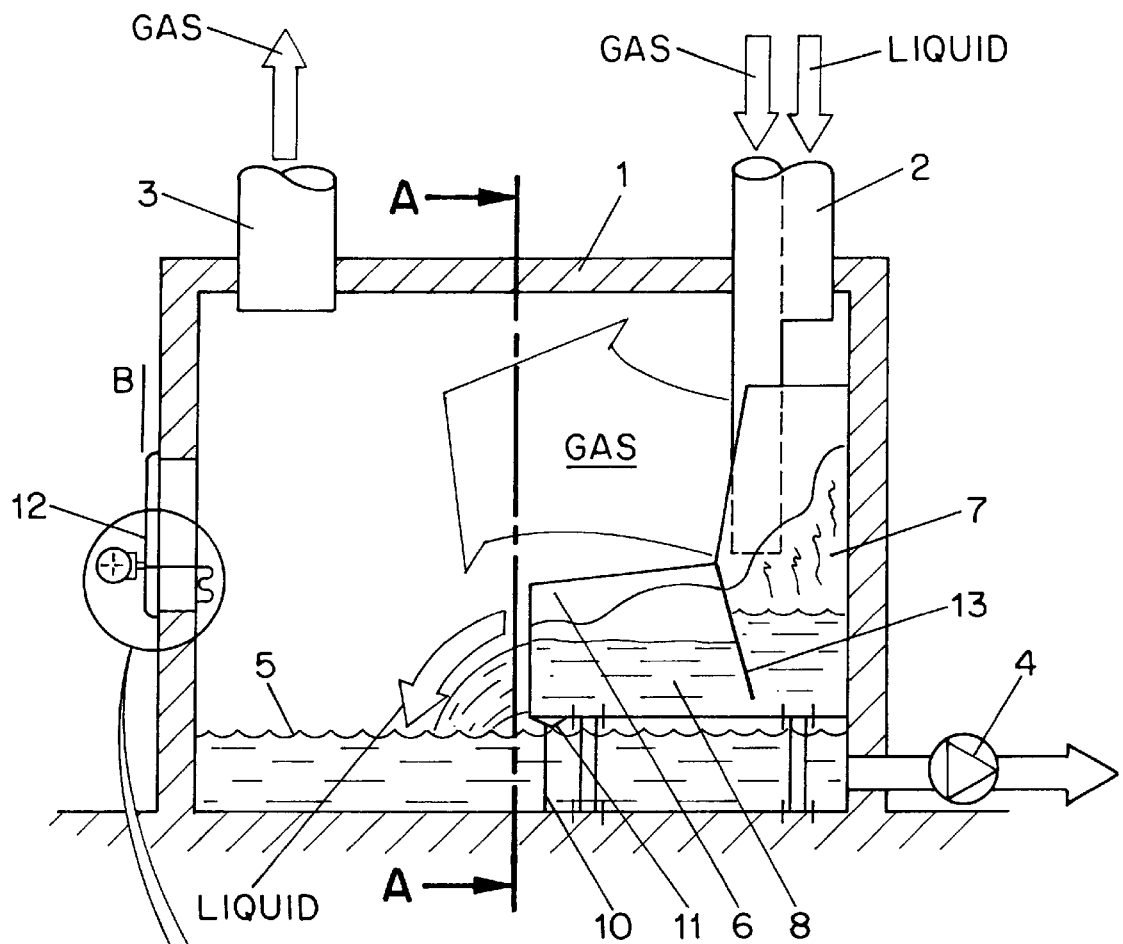

United States Patent [19]
Karvinen

[11] Patent Number: 6,053,039
[45] Date of Patent: Apr. 25, 2000

[54] APPARATUS FOR THE MEASUREMENT OF LIQUID FLOW

[75] Inventor: Juha Karvinen, Huutjarvi, Finland

[73] Assignee: Ecopump Oy, Kotka, Finland

[21] Appl. No.: 09/171,187

[22] PCT Filed: Apr. 11, 1997

[86] PCT No.: PCT/FI97/00218

§ 371 Date: Oct. 14, 1998

§ 102(e) Date: Oct. 14, 1998

[87] PCT Pub. No.: WO97/40349

PCT Pub. Date: Oct. 30, 1997

[30] Foreign Application Priority Data

Apr. 16, 1996 [FI] Finland ................................ 961664

[51] Int. Cl.$^7$ .................................................. G01F 1/20
[52] U.S. Cl. ................................................ 73/149; 73/215
[58] Field of Search .................... 73/149, 215, 19.12, 73/31.07

[56] References Cited

U.S. PATENT DOCUMENTS

| | | | |
|---|---|---|---|
| 1,211,794 | 1/1917 | Lossau | 73/215 |
| 1,505,050 | 8/1924 | Lauritsen | 73/215 |
| 1,635,414 | 7/1927 | Hirst | 73/215 |
| 3,557,869 | 1/1971 | Kriftel et al. | 73/215 |
| 3,581,469 | 6/1971 | Davis et al. | 73/215 |
| 3,934,472 | 1/1976 | Bradham | 73/215 |
| 4,061,031 | 12/1977 | Grimsrud | 73/215 |
| 4,195,520 | 4/1980 | Shaver | 73/215 |
| 5,024,084 | 6/1991 | Frawley, Jr. | 73/215 |
| 5,841,020 | 11/1998 | Guelich | 73/19.12 |
| 5,852,240 | 12/1998 | LeBlanc | 73/215 |

FOREIGN PATENT DOCUMENTS

| | | |
|---|---|---|
| 0134836 | 3/1985 | European Pat. Off. . |
| 3740603 | 6/1989 | Germany . |

*Primary Examiner*—Hezron Williams
*Assistant Examiner*—Chad Soliz
*Attorney, Agent, or Firm*—Baker Botts L.L.P.

[57] ABSTRACT

Apparatus for measuring the rate of flow of liquid through a liquid/air separator having a chamber space provided with at least one liquid/gas inlet duct, at least one gas outlet duct and at least one liquid outlet duct, includes a measuring receptacle disposed in the chamber into which liquid is received from the inlet duct. The measuring receptacle has an inflow compartment located below the inlet duct and receives the liquid from the inlet duct and a measuring compartment partially separated from the inflow compartment by a partition arranged so that liquid is accumulated and slowed in the inflow compartment. The measuring compartment has an outlet above a surface level of liquid in the chamber space. A suitable measuring device measures the quantity of liquid in the measuring compartment.

7 Claims, 2 Drawing Sheets

APPARATUS FOR THE MEASUREMENT OF LIQUID FLOW

The present invention relates to an apparatus for the measurement of the rate of liquid flow through a liquid/air separator.

It is fairly common in paper machines and the like to use water separators built of concrete. Such water separators are usually the size of a small room. An air/water flow is passed into them by suction from at least one source. So far it has been very difficult to measure the amounts of water involved.

The object of the present invention is to achieve an apparatus which makes it possible to avoid the drawbacks of prior art and to measure the above-mentioned water quantities.

The apparatus of the invention has numerous significant advantages. Using this apparatus, it is possible to measure water quantities flowing into the liquid separator at a very high rate of flow. The invention also makes it possible to perform measurements inside water separators in paper machines, allowing a very high measurement accuracy to be achieved.

Figure 3:
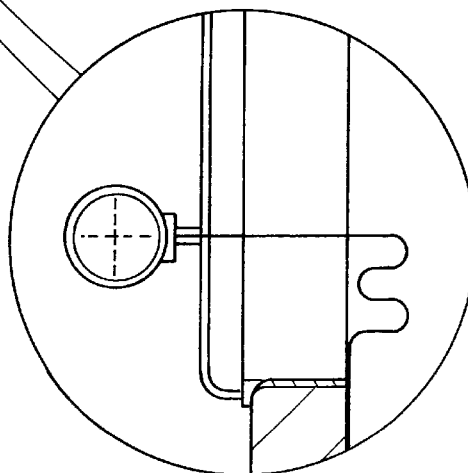
Figure 2:
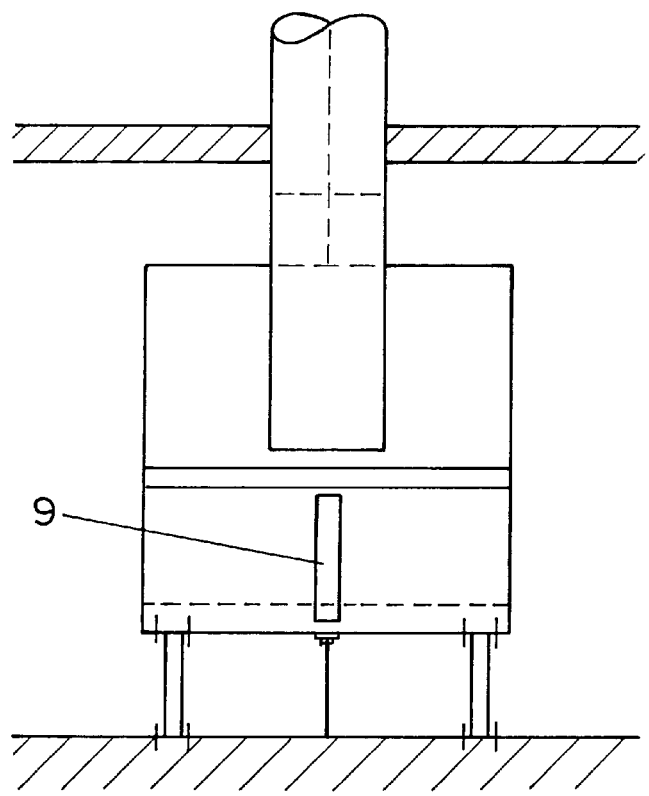
Figures 4A, 4B:
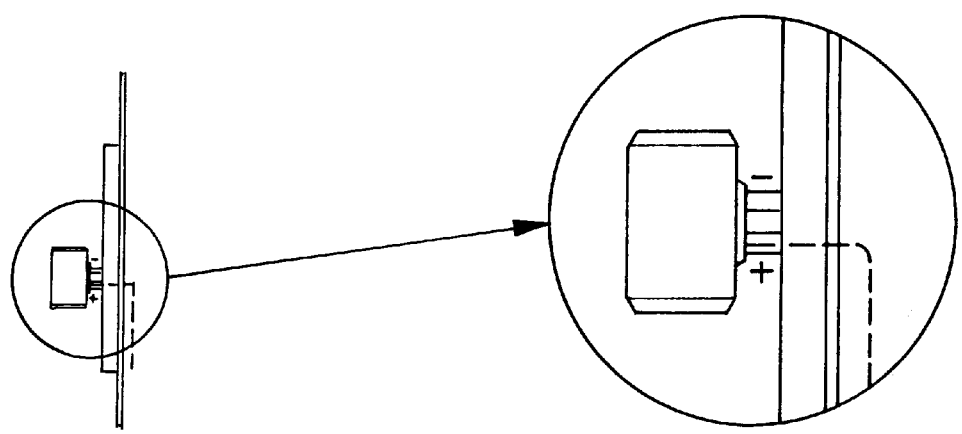

In the following, the invention is described by the aid of a preferred example by referring to the attached drawings, in which FIG. 1 presents a sectioned side view of an apparatus as provided by the invention, FIG. 2 presents the apparatus sectioned along line A—A in FIG. 1, FIG. 3 presents a detail of FIG. 1, and FIG. 4 presents a detail of FIG. 1 as seen from the direction of arrow B.

The water separator of paper machines and equivalent is formed in a chamber space delimited by walls 1. The walls may be made of concrete and the chamber space is of a size corresponding to a small room. A mixture of liquid and air is passed into the chamber space through at least one inlet duct 2, preferably from the upper part of the chamber. In the chamber space, the liquid is separated and it is removed via at least one liquid outlet duct disposed in the lower part of the chamber, preferably by means of a pump device 4. The air is removed from the chamber preferably via an air outlet duct 3 disposed in the upper part of the chamber, preferably by means of a vacuum pump. The level 5 of the liquid gathered in the lower part of the chamber space is maintained below a desired maximum height by means of the pump device 4.

In the inlet duct 2, air and liquid flow at a high rate. The inlet duct 2 usually extends to the inside of the chamber space, and a part of the wall of the duct portion inside the chamber space has been removed, preferably the tube has been cut longitudinally in two halves over a certain length and one half of the tube thus split has been removed. This promotes the separation of air. Placed under the inlet duct 2 is receptacle 6 for flow measurement. The receptacle is divided into two parts: an inflow compartment 7, such as a smoothing compartment where the liquid is gathered into the receptacle and its velocity is slowed down, and a measuring compartment 8.

In an apparatus as illustrated by the figure, the liquid flow is slowed down by allowing the liquid to flow from the inflow compartment 7 through an opening in the lower part of the partition 13 between the inflow compartment and the measuring section 8, said opening extending across the whole width of the receptacle, into the measuring section 8. In the measuring section, the amount of water is determined by the weir flow metering technique. In this case, at least one of the walls of the measuring section 8 is provided with a gap 9 through which the liquid is passed onto the bottom of the chamber space. In the weir flow metering procedure, the measuring receptacle 6 is above the surface level 5 of the liquid on the bottom of the chamber space. The partition 13 is preferably used as a guide plate to pass the water down in a controlled manner. The lower edge of the partition 13 is below the lower edge of the gap 9, so the separated water will flow between the 25 lower edge of the partition and the bottom of the receptacle 6. In this way, the flow is smoothed down and the water seal thus formed prevents the access of air into the measuring compartment 8 of the receptacle.

The surface level (which is proportional to the flow rate) of the liquid gathered in the measuring receptacle 6 is determined by using a differential pressure transmitter. The positive side of the differential pressure transmitter is connected to a capillary tube 10 provided with a detector membrane 11 at one end of the tube. The negative side of the transmitter is connected to measure the vacuum variations inside the separator.

The chamber wall 1 is provided with an opening with a manhole 12. The manhole is usually smaller than the measuring receptacle 6 required. The measuring receptacle 6 has been built to be assembled from parts that can be introduced into the chamber through the manhole.

It is obvious to a person skilled in the art that the invention is not limited to the embodiments described above, but that it can be varied within the scope of the attached claims.

I claim:

1. Apparatus for measuring the rate of flow of liquid through a liquid/air separator having a chamber space provided with at least one liquid/gas inlet duct, at least one gas outlet duct and at least one liquid outlet duct, comprising a measuring receptacle disposed in the chamber into which liquid is received from the inlet duct, the measuring receptacle having an inflow compartment located below the inlet duct and receiving the liquid from the inlet duct and a measuring compartment partially separated from the inflow compartment by a partition arranged so that air and water are separated in the inflow compartment and liquid is accumulated and slowed in the inflow compartment, the measuring compartment having an outlet above a surface level of liquid in the chamber space, and means for measuring the quantity of liquid in the measuring compartment.

2. The apparatus according to claim 1, wherein the outlet from the measuring compartment is a weir, and the means for measuring the quantity of liquid in the measuring compartment measures a level of the liquid in the measuring compartment.

3. The apparatus according to claim 1, wherein the measuring receptacle is a body separate from the liquid separator.

4. The apparatus according to claim 1, wherein the inflow compartment and partition are arranged so that the velocity of liquid flowing through from the inlet duct is slowed down and the velocity of flow through the measuring compartment is lower than the velocity of flow from the inlet duct.

5. The apparatus according to claim 1, wherein air and water are separated in the inflow compartment.

6. The apparatus according to claim 1, wherein the flow of air from the inflow compartment into the measuring compartment is blocked by means of a water seal formed by the partition.

7. The apparatus according to claim 1, wherein the measuring receptacle is constructed so that it can be assembled inside the liquid water separator.

* * * * *